United States Patent
Ginter et al.

(10) Patent No.: US 7,785,041 B2
(45) Date of Patent: Aug. 31, 2010

(54) SETTING METHOD FOR ANCHORING A FASTENING ELEMENT

(75) Inventors: Herbert Ginter, Germaringen (DE); Roman Skupien, Schwabmuenchen (DE)

(73) Assignee: Hilti Aktiengesellschaft, FL-Schaan (LI)

( * ) Notice: Subject to any disclaimer, the term of this patent is extended or adjusted under 35 U.S.C. 154(b) by 0 days.

(21) Appl. No.: 12/387,306

(22) Filed: Apr. 29, 2009

(65) Prior Publication Data

US 2009/0290941 A1    Nov. 26, 2009

(30) Foreign Application Priority Data

May 21, 2008  (DE) ........................ 10 2008 001 904

(51) Int. Cl.
  *E21D 20/02*  (2006.01)
(52) U.S. Cl. .................................. 405/259.6; 405/259.5
(58) Field of Classification Search .............. 405/259.6, 405/259.5, 259.1
  See application file for complete search history.

(56) References Cited

U.S. PATENT DOCUMENTS

| | | | |
|---|---|---|---|
| 4,192,631 A * | 3/1980 | Vass | 405/259.6 |
| 4,564,315 A * | 1/1986 | Rozanc | 405/259.6 |
| 4,652,175 A | 3/1987 | Mauthe | |
| 4,944,819 A * | 7/1990 | Gebauer | 405/259.6 |
| 5,076,734 A * | 12/1991 | Hipkins, Sr. | 405/259.5 |
| 5,490,365 A * | 2/1996 | Roth | 405/259.6 |
| 5,531,546 A | 7/1996 | Herdlicka | |
| 5,785,462 A * | 7/1998 | Hein et al. | 405/259.6 |
| 6,390,735 B1 * | 5/2002 | Gaudreau et al. | 405/259.6 |
| 6,416,256 B1 * | 7/2002 | Surjan et al. | 405/259.5 |
| 2007/0297862 A1 | 12/2007 | Giralde | |
| 2009/0052995 A1 | 2/2009 | Eriksson | |

FOREIGN PATENT DOCUMENTS

| | | |
|---|---|---|
| DE | 102006011652 | 9/2007 |
| EP | 1275861 | 1/2002 |
| GB | 2034850 | 6/1980 |
| GB | 2241759 | 9/1991 |

* cited by examiner

*Primary Examiner*—Frederick L Lagman
(74) *Attorney, Agent, or Firm*—Abelman, Frayne & Schwab

(57) ABSTRACT

A setting method of anchoring a fastening element (11; 41) in a constructional component (21) with a hardenable multi-component mass (31) includes drilling a borehole (22) in the constructional component (21) with a drill (36) until a borehole depth (T), which is at least by 5% greater than a necessary anchoring length (L) of the fastening element (21; 41), is reached; introducing the hardenable multicomponent mass (31) in the uncleaned borehole (22), inserting, in the borehole (22) the fastening element (11; 41) with its mixing section (13; 43) first, and power-driving the fastening element (11; 41) into the filled borehole (22) with a rotary driving tool, with intermixing of the hardenable multi-component mass (31) with drillings (23) remaining in the borehole (22), until the necessary anchoring length (L) of the fastening element (11; 41) is reached.

8 Claims, 2 Drawing Sheets

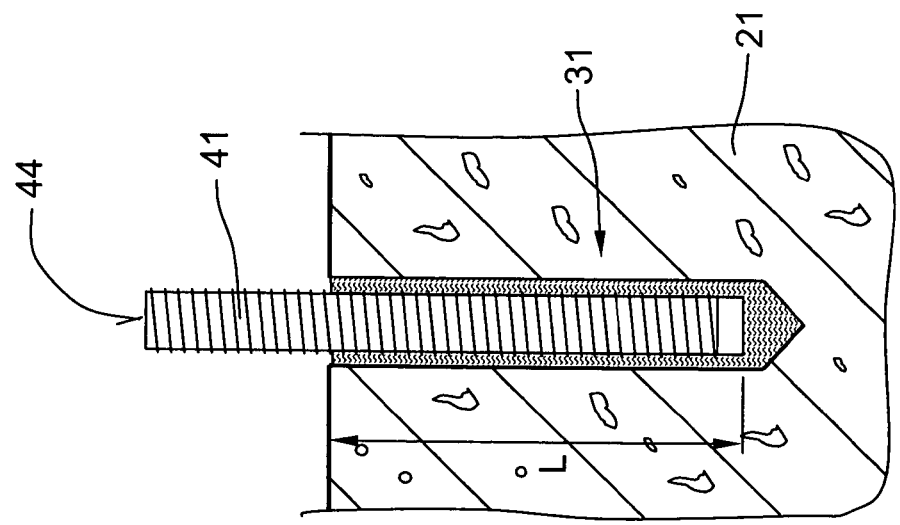
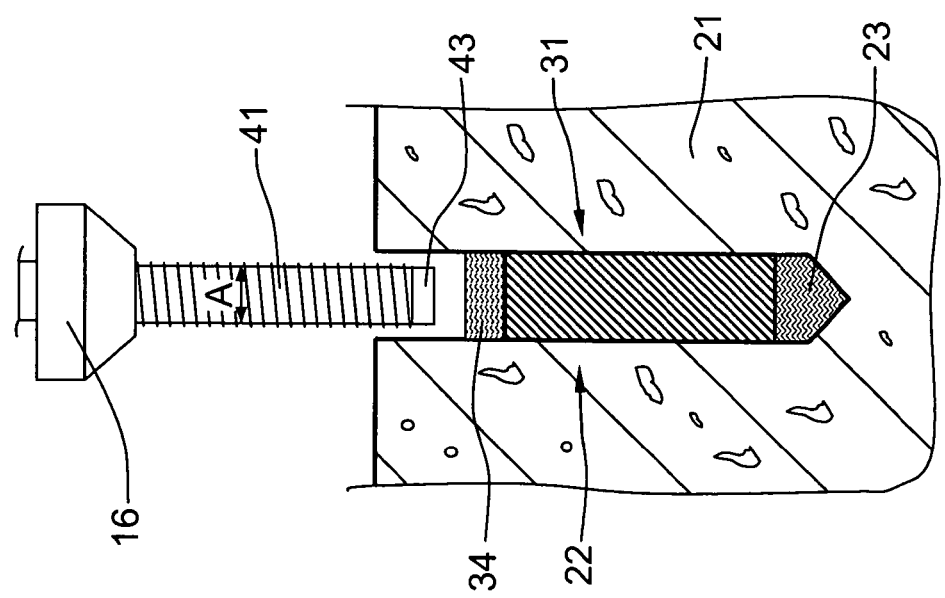
Fig. 5
Fig. 4

SETTING METHOD FOR ANCHORING A FASTENING ELEMENT

BACKGROUND OF THE INVENTION

1. Field of the Invention

The present invention relates to a setting method for anchoring a fastening element having a mixing section in a borehole with a hardenable multi-component compound.

2. Description of the Prior Art

For chemical anchoring of a fastening element such as anchor rod, threaded rod, threaded sleeve, screw anchor, or reinforcement bar in a substrate such as a constructional component or a workpiece, a borehole is produced, cleaned, and filled with a hardenable compound which advantageously includes multiple components, e.g., a two-component mortar compound. The fastening element is then set in the filled borehole. After the compound hardens, the fastening element has high load values. Unlike mechanically anchored fastening elements, fastening elements of the kind described above are anchored in the substrate without expansion forces so that there is the possibility of small edge distances and axial distances of the anchored fastening element in the substrate. Mounting parts are secured to the substrate, for example, by nuts, at the free end of the fastening element anchored in the substrate.

European Publication EP 0 150 555 A1 discloses a setting process according to which firstly, a borehole is formed, a hardenable multi-component mass is packed in a cartridge that is placed in the borehole and, finally, a fastening element with a mixing knife that forms a mixing section is screwed in by a rotary driving device, with the cartridge being destroyed and the components of the hardenable, multi-component compound being mixed together.

German Publication DE 10 2005 042 481 A1 discloses a setting process according to which a preliminary formed bore is filled with a hardenable multi-component mass and, finally, an anchor rod is manually set in by being slightly rotated. A complete intermixing of the hardenable multi-component mass with this setting method is not achieved.

As was stated, for example, in DE 34 42 383 A1, it was considered essential in technical circles up until now to clean the borehole prior to introducing the hardenable multi-component compound, which represents a substantial expenditure for producing the attachments, particularly for series applications.

It is the object of the present invention to provide a setting process for anchoring of a fastening element with a hardenable compound and which does not require any preliminary cleaning of the borehole.

SUMMARY OF THE INVENTION

This and other objects of the present invention, which will become apparent hereinafter, are achieved by providing a setting method for anchoring a fastening element having an outer diameter and a mixing section in a constructional component with a hardenable multi-component mass, the method comprising the steps of:

drilling a borehole in the constructional component with a drill until a borehole depth, which is at least by 5% greater than a necessary anchoring length of the fastening element, is reached;

introducing the hardenable multi-component mass in the uncleaned borehole with an ejection tool;

inserting, in the borehole the fastening element with its mixing section first; and power-driving the fastening element into the filled borehole with a rotary driving tool, with intermixing of the hardenable multi-component mass with drillings remaining in the borehole, until the necessary anchoring length of the fastening element is reached.

A borehole, which has a depth greater than the necessary anchoring length of the fastening element, provides, in the region of its bottom, a space for receiving a portion of drilling dust or drillings remaining in the borehole in a region of the constructional component that does not affect the load. Dependent on the drilling direction and the size of the borehole, approximately from 5% by weight to 25% by weight of the entire mass to be removed from the borehole remain in the borehole. In order to reduce the amount of the drilling dust or drillings remaining in the borehole, during a drilling process, the drill can be withdrawn from the borehole and then again driven in until a predetermined borehole dept is reached. This permits to remove the drilling dust or drillings from the borehole, which remain in helices of the drill, without additional expense. An uncleaned borehole is a borehole from which the drilling dust or drillings, which remain in the borehole, are not removed by separate devices such as brushes or blowing-out devices.

When a, preferably, pasty hardenable multi-component mass is introduced into an uncleaned borehole, care should be taken that filling of the region near the borehole bottom is effected blast-free. The amount of the hardenable multi-component mass introduceable in the borehole depends on the volume of free space between the borehole and the fastening element. E.g., if a borehole is filled to a half or two/third with the hardenable multi-component mass, the excessive amount of the hardenable, multi-component mass exits the borehole upon the fastening element being set in.

With power-drilling of the fastening element provided with a mixing section and which, e.g., is directly received in a chuck of rotary driving tool, e.g., a hammer drill or screw-driving tool, the components of the hardenable multi-component mass, which were introduced in the borehole, intermix, with admixing of a portion of the drilling dust or drillings remaining in the borehole. Upon reaching the necessary anchoring length, the rotary driving tool is disengaged from the fastening element. After expiration of the temperature-dependent hardening time of the hardenable mass, a mounting part is secured to the constructional component at the free end of the fastening element projecting from the constructional component.

The inventive setting method is characterized by a more rapid course of the process and a noticeably smaller dust load. Further, a smaller number of power tools or working tools is necessary for anchoring because borehole cleaning before introduction of the hardenable multi-component mass is eliminated.

Preferably, a drill a nominal diameter of which corresponds to from 1.05 to 1.5 times of the outer diameter of the fastening element, is used. Thereby, an adequate annular gap between the borehole and the fastening element for the displaced, during drive-in of the fastening element, amount of the hardenable multi-component mass is insured. This insures a complete enveloping of the set fastening element along the entire necessary anchoring length.

Advantageously, the produced borehole depth is maximum by 15% greater than the necessary anchoring length of the fastening element. This depth provides a sufficient large receiving space at the borehole bottom for the drilling dust or drillings remaining in the borehole, however, without excessively large increase in costs of forming a borehole in a hard constructional component.

Advantageously, the components of the hardenable multi-component mass are introduced in the borehole in a non-mixed state. This permits to eliminate a mixing device in the injection tool. It is sufficient to use an injection tube for ejection of the components from the injection device. With the elimination of the mixing device, the expenditure of forces for ejecting components from the injection device is reduced. The components are introduced axially parallel to each other side-by-side through an injection tube into a borehole. Because the component interact with each other in a limited region, the available processing time, during which a fastening element must be brought into the borehole, noticeably increases in comparison with the case when a mixed hardenable mass is introduced in the borehole. It is, in particular, advantageous at series applications when a plurality fastening elements must be set. In addition, no or very limited hardening of the components in the injection tube takes place. This reduces mortar losses and the amount of waste. Further, the injection tube without a static mixer is much easily produced than an injection tube with a static mixer, whereby the costs of anchoring of a fastening element are noticeably reduced. Still further, decoupling of the processing time and the hardening time of the hardenable multi-component mass enables to use more rapidly hardenable masses.

Advantageously, a predetermined amount of a filling material with a predetermined distribution of particle sizes is introduced in the borehole after introduction of the hardenable multi-component mass and before power-driving the fastening element. The filling material facilitates intermixing of the components of the hardenable mass and also admixing of the drilling dust or drillings which remain in the borehole. In addition, during the power-driving of a fastening element in the borehole, the particles of the filling material profile the borehole wall, providing therein undercut regions. This advantageously improves bonding of the hardenable mass with the borehole wall and, thereby, insures an improved anchoring.

Advantageously, a predetermined amount of the filling material is made available to the user in a corresponding packaging. E.g., the filling material can be packed in a bag, a foil container, or any other container easily destroyable by a fastening element.

Advantageously, the predetermined amount of the filling material corresponds to from 10% by volume to 30% by volume of a volume of the introduced hardenable multi-component mass.

This insures an advantageous intermixing of the components of the hardenable mass and, if necessary, profiling of the borehole wall during rotation of the fastening element.

Advantageously, the particle size of the filling material corresponds to form 0.05 to 0.5 times of the outer diameter of the fastening element. This insures that the particle size essentially corresponds to the size of the annular gap between the borehole wall and the fastening element.

Advantageously, corundus is used as a filling material. The corundus has a hardness sufficient, in particular, for profiling the borehole wall. Alternatively, quartz sand or other mineral filler having a sufficiently high hardness for profiling the borehole wall can be used as a filling material.

Advantageously, a fastening element having a righthand thread and driven in a counter-clockwise direction is used. With a right-hand thread of the fastening element and its counter-clockwise rotation, the hardenable mass is fed into the borehole, a certain compression of the hardenable mass and of the drilling dust or drillings remaining in the borehole is achieved.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4 a view illustrating a first step of the setting method according to the second embodiment; and FIG. 5 a view illustrating a second step of the setting method according to the second embodiment.

DETAILED DESCRIPTION OF THE PREFERRED EMBODIMENTS

Figure 3:
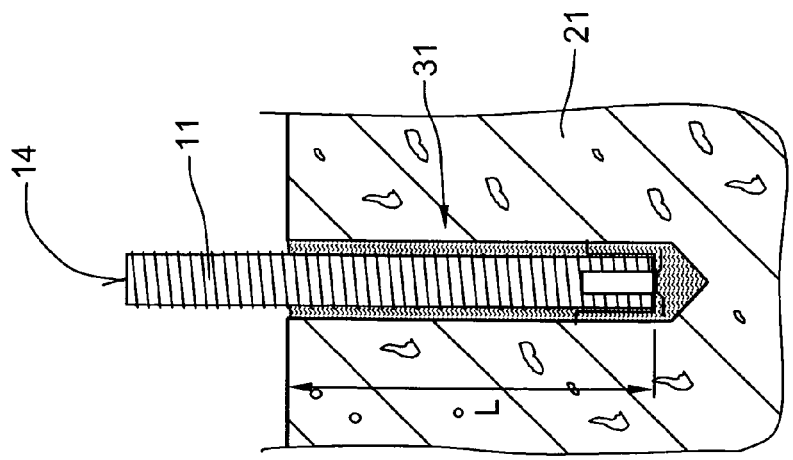
FIG. 3 a view illustrating a third step of the setting method according to the first embodiment.
Figure 2:
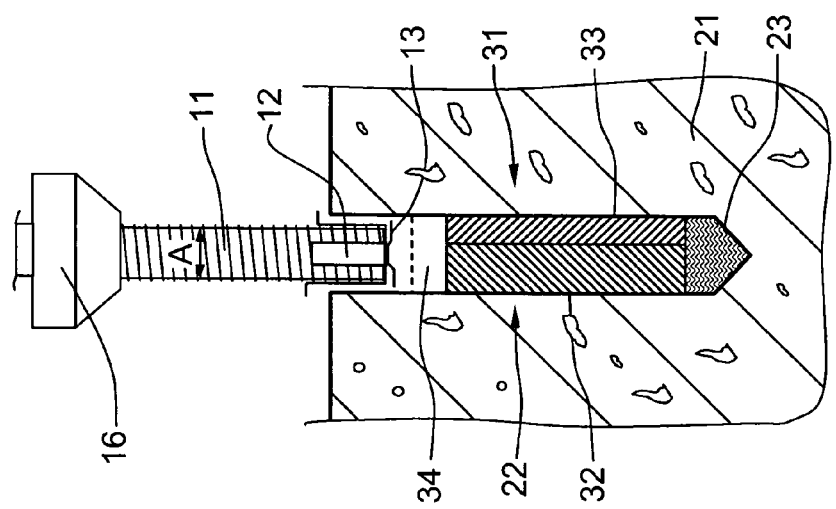
Figure 1:
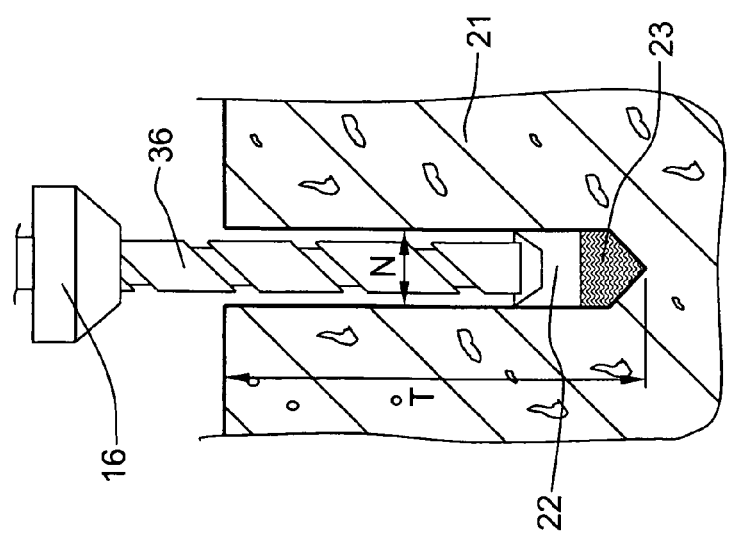
FIG. 1 a view illustrating a first step of a first embodiment of a setting method according to the present invention FIG. 2 a view illustrating a second step of the setting method according to the first embodiment.

A setting process for anchoring a fastening element 11 according to the present invention, which illustrated in FIGS. 1-3, is explained by an example of anchoring of M12-threaded rod having a profile in form a righthand thread in a constructional component 21, e.g., in a concrete ceiling, with a hardenable multi-component mass 31.

In the first step, a borehole 22 is formed in the constructional component 21 with a drill 36, e.g., a hammer drill. The produced borehole depth is by 10% greater than the necessary anchoring length L of the fastening element 11. The necessary anchoring length L of a M12-threaded rod in a concrete constructional component is about 100 mm, so that a corresponding borehole depth of 110 mm is selected. The drill 36 has a nominal diameter N corresponding to 1.2 times of the outer diameter A of the fastening element 11. With the M12-threaded rod, the nominal diameter of the drill 36 of 14 mm is selected. A drilling dust, e.g., drillings 23, which are produced during drilling process, remain in the borehole 22.

Without cleaning the borehole, advantageously a pasty hardenable multi-component mass 31 is introduced with an injection tool, not shown, into the borehole 22 in which the drilling dust or drillings 23 remain. Both components, resin 32 and hardening component 33 of the multi-component mass 31 are introduced into the borehole 22 in a non-mixed state. Optionally, in addition, a definite amount of filling material 34 is also introduced into the borehole 22.

At the end of the fastening element 11, there is provided, e.g., a profiling/mixing element 12 having a mixing section 13. Then, a fastening element 11 with the mixing section 13 is driven into the borehole 22, preferably, being rotated counter-clockwise by a hammer drill used as a rotary driving tool. The fastening element 11 is being driven in until it reaches its necessary anchoring length L. In FIG. 1, only a chuck 16 of the rotary driving tool is shown. During the setting of the fastening element 11, the resin 32, the hardening agent 33 and a portion of the drilling dust remaining in the borehole, e.g., drillings 23 intermix with each other. Simultaneously, the wall of the borehole 22 is profiled by the profiling section of the profiling/mixing element 12 of the fastening element 11 for producing of undercut.

After the hardenable mass 31 has hardened, a mounting part, not shown, can be secured to the constructional component 21 at the free end 14 of the fastening element 11.

The setting process for anchoring a fastening element 41, here, e.g., a M10-threaded rod, in a constructional component 21 with a hardenable mass 31 which is illustrated in FIGS. 4-5, differs from the above-described setting process in that after forming the borehole 22, the hardenable multi-component mass is introduced in the borehole 22 in a mixed state by an injection tool, not shown, without preliminary cleaning the borehole. Then, a definite amount of the filling material 34 with a predetermined distribution of particle sizes introduced in the borehole 22 before the fastening element 41 is driven into the borehole 22.

The filling material 34, preferably corundum, has an adequate hardness for profiling the wall of the borehole 22 and is made available to the user, e.g., in a bag. The predetermined amount of the filling material corresponds from 10% to 30% by volume of the volume of the hardenable multi-component mass 31 introduced into the borehole 22. The size of the particles of the filling material 34 is, in the discussed embodiment, 1-2 mm, which corresponds, with a M10-threaded rod as the fastening element 41, to 0.2 of the outer diameter A of the fastening element 41.

At the front end of the fastening element 41, there is provided a mixing knife as a mixing section 43. After introducing of the fastening element 41 with the mixing section 43 first in the borehole 22, the fastening element 41 is driven in the filled borehole 22 with a screwdriving tool used as a rotary driving tool until it is driven up to the necessary anchoring length L for the fastening element 41. As in FIG. 2, only the chuck 16 of the rotary diving tool is shown. As a result of the fastening element being driven in the hardenable mass 31, filling material 34, and a portion of drilling dust or drillings 23 remaining in the borehole 22 are intermixed with each other. Simultaneously, the wall of the borehole 22 is profiled by the hard, coarse filling material for producing undercuts. After hardening of the hardenable mass 31, a mounting part, not shown, can be secured to the constructional component 21 at the free end 44 of the fastening element 41.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A setting method for anchoring a fastening element (11; 41) having an outer diameter (A) and a mixing section (13; 43) in a constructional component (21) with a hardenable multi-component mass (31), the method comprising the steps of:
    drilling a borehole (22) in the constructional component (21) with a drill (36) until a borehole depth (T), which is at least by 5% greater than a necessary anchoring length (L) of the fastening element (21; 41), is reached;
    introducing the hardenable multicomponent mass (31) in the uncleaned borehole (22) with an injection tool;
    introducing, in the borehole (22), a predetermined amount of a filling material (34) with a predetermined distribution of particle sizes after introduction of the hardenable multi-component mass (31);
    inserting, in the borehole (22) the fastening element (11; 41) with the mixing section (13; 43) thereof first; and
    power-driving the fastening element (11; 41) into the filled borehole (22) with a rotary driving tool, with intermixing of the hardenable multi-component mass (31) with drillings (23) remaining in the borehole (22), until the necessary anchoring length (L) of the fastening element (11; 41) is reached.

2. A setting process according to claim 1, wherein the predetermined amount of the filling material (34) corresponds to from 10% by volume to 30% by volume of a volume of the introduced hardenable multi-component mass (31).

3. A setting method according to claim 1, wherein a particle size of the filling material (34) corresponds to form 0.05 to 0.5 times of the outer diameter of the fastening element (11; 41).

4. A setting method according to claim 1, wherein the filling material (34) is corundum.

5. A setting method for anchoring a fastening element (11; 41) in a constructional component (21) with a hardenable multi-component mass (31), the fastening element having an outer diameter (A) and a mixing section (13; 43) provided at an end of the fastening element, the method comprising the steps of:
    drilling a borehole (22) in the constructional component (21) with a drill (36) having a nominal diameter (N) corresponding to about 1.5-1.5 times of the outer diameter (A) of the fastening element (11;41) until a borehole depth (T), which is at least by 5% greater than a necessary anchoring length (L) of the fastening element (21; 41), is reached;
    introducing the hardenable multicomponent mass (31) in the uncleaned borehole (22) with an injection tool;
    inserting, in the borehole (22) the fastening element (11; 41) with the end of the fastening element (11; 41) with the mixing section (13; 43) thereof first; and
    power-driving the fastening element (11; 41) into the filled borehole (22) with a rotary driving tool, with intermixing of the hardenable multi-component mass (31) with drillings (23) remaining in the borehole (22), until the necessary anchoring length (L) of the fastening element (11; 41) is reached.

6. A setting method according to claim 5, wherein the drilling step comprises drilling of the borehole (22) until the borehole depth (T), which is maximum by 15% greater than the necessary anchoring length L of the fastening element (11; 41) is reached.

7. A setting method according to claim 5, wherein the introducing step comprises introducing components (32; 33) of the hardenable, multi-component mass (31) in a non-mixed state.

8. A setting method according to claim 5, comprising the step of selecting the fastening element (11; 41) having a righthand thread; and wherein the power-drilling includes driving the fastening element (11; 41) in a counter-clockwise direction.

* * * * *